United States Patent

Feldner

Patent Number: 5,822,875
Date of Patent: Oct. 20, 1998

[54] SCANNING ELECTRON MICROSCOPIC RULER AND METHOD

[75] Inventor: Klaus Feldner, Fishkill, N.Y.

[73] Assignee: Siemens Aktiengesellschaft, Munich, Germany

[21] Appl. No.: 867,772

[22] Filed: Jun. 2, 1997

Related U.S. Application Data

[63] Continuation of Ser. No. 512,869, Aug. 9, 1995, abandoned.

[51] Int. Cl.$^6$ ........................................ G01B 3/04
[52] U.S. Cl. ........................................ 33/494; 33/491
[58] Field of Search ................. 33/1 B, 1 C, 483, 33/494, 491, 501.45; 40/360

[56] References Cited

U.S. PATENT DOCUMENTS

| | | | |
|---|---|---|---|
| 623,857 | 4/1899 | Williams | 40/360 |
| 1,157,389 | 10/1915 | Hess | 33/501.45 |
| 1,674,222 | 6/1928 | Quigley | 40/360 |
| 2,156,524 | 5/1939 | Christensen | 33/491 |
| 2,819,526 | 1/1958 | Brown, Jr. | 33/1 C |
| 2,826,816 | 3/1958 | Major | 33/491 |
| 3,239,937 | 3/1966 | Sawyer et al. | 33/494 |
| 3,423,836 | 1/1969 | Barron . | |
| 3,686,764 | 8/1972 | Oesterritter | 33/1 C |
| 3,724,959 | 4/1973 | Koulicovitch . | |
| 4,024,831 | 5/1977 | Sperling . | |
| 4,068,381 | 1/1978 | Ballard et al. . | |
| 4,131,998 | 1/1979 | Spears | 33/1 C |
| 4,139,933 | 2/1979 | Ballard et al. . | |
| 4,385,317 | 5/1983 | Furuya et al. . | |
| 4,446,624 | 5/1984 | Nowell et al. | 33/1 C |
| 4,559,705 | 12/1985 | Hodge et al. . | |
| 4,980,763 | 12/1990 | Lia . | |
| 5,174,031 | 12/1992 | Davis | 33/1 B |
| 5,191,393 | 3/1993 | Hignette et al. . | |
| 5,400,513 | 3/1995 | Duffield | 33/1 B |

FOREIGN PATENT DOCUMENTS

| | | | |
|---|---|---|---|
| 2840669 | 3/1980 | Germany | 33/491 |
| 67901 | 1/1990 | Japan | 33/483 |

*Primary Examiner*—Thomas B. Will
*Attorney, Agent, or Firm*—Donald B. Paschburg

[57] ABSTRACT

A set of ruled devices and method for measuring an actual dimension of a specimen displayed as a magnified image by a magnification system such as a scanning electron microscope having a plurality of selected magnification factors. The magnified image includes dimensions that correspond to a predetermined selected magnification. A set of ruled devices is provided, whereby each ruled device includes indicia that corresponds to one of the magnification factors. A ruled device that corresponds to the predetermined selected magnification is selected. The dimension of the image is measured with the selected ruled device, whereby the indicia of the selected ruled device indicates the actual dimension of the specimen.

15 Claims, 5 Drawing Sheets

Angstroms    Magnification 10K    K. Feldner

Angstroms    Magnification 15K    K. Feldner

Angstroms    Magnification 20K    K. Feldner

Angstroms    Magnification 25K    K. Feldner

Angstroms    Magnification 30K    K. Feldner

Angstroms    Magnification 35K    K. Feldner

Angstroms    Magnification 40K    K. Feldner

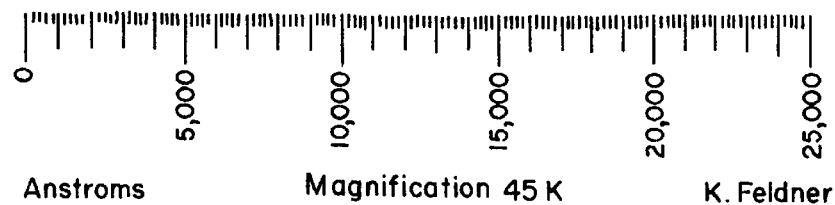
Anstroms     Magnification 45 K     K. Feldner     *FIG. 3H*
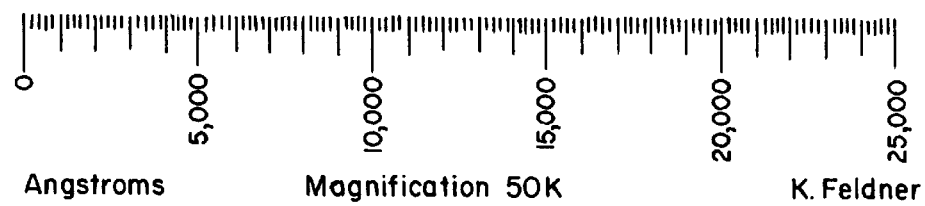
Angstroms     Magnification 50K     K. Feldner     *FIG. 3I*
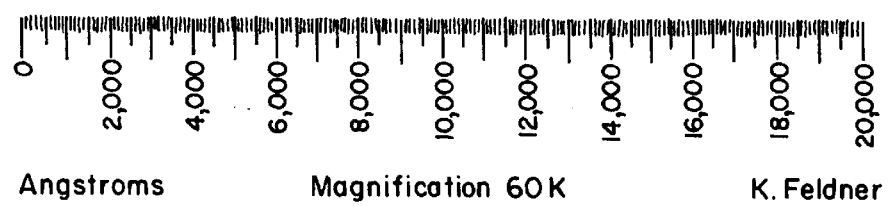
Angstroms     Magnification 60K     K. Feldner     *FIG. 3J*
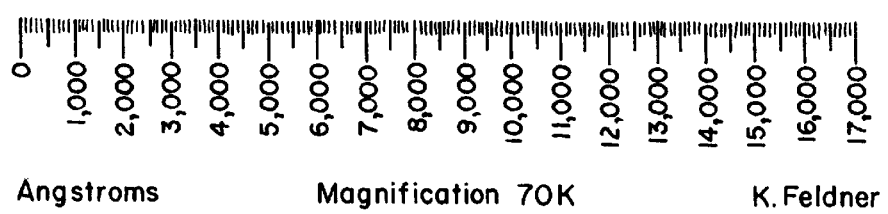
Angstroms     Magnification 70K     K. Feldner     *FIG. 3K*
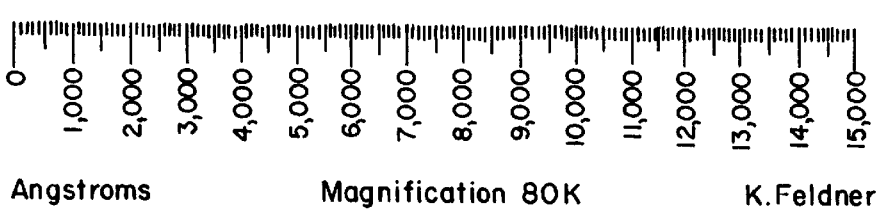
Angstroms     Magnification 80K     K. Feldner     *FIG. 3L*
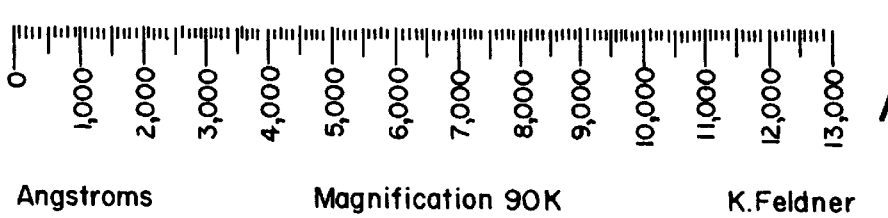
Angstroms     Magnification 90K     K. Feldner     *FIG. 3M*
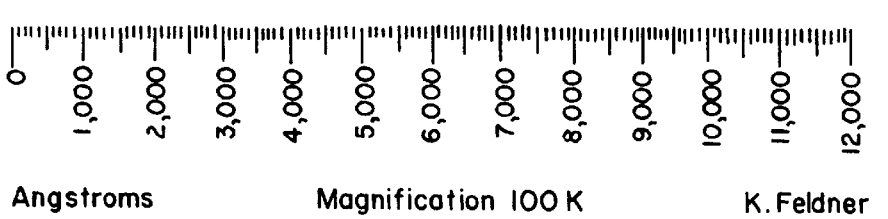
Angstroms     Magnification 100 K     K. Feldner     *FIG. 3N*

5,822,875

SCANNING ELECTRON MICROSCOPIC RULER AND METHOD

CROSS-REFERENCE TO RELATED APPLICATION

This is a continuation of Ser. No. 08/512,869 filed Aug. 9, 1995 now abandoned.

FIELD OF THE INVENTION

The present invention relates generally to measuring devices, and more particularly to a set of measuring devices and a method for using the devices to measure an actual dimension of a specimen displayed as a magnified image by a magnification system such as a scanning electron microscope (SEM).

BACKGROUND OF THE INVENTION

In the technical arts, it is often required to determine the actual size of an object displayed in a photograph or other image. This need is particularly profound for photographs or images produced by magnification systems such as scanning electron microscopes. The prior art is replete with patents that disclose such methods and devices. For example, U.S. Pat. Nos. 4,068,381 and 4,139,933 both to Ballard, describe a scanning electron microscope micrometer scale and method for fabricating same, U.S. Pat. No. 5,191,393 to Hignette et al describes an optical measurement device and method for optically measuring submicron dimensions of an object, U.S. Pat. No. 4,980,763 to Lia describes a system for measuring objects viewed through a borescope, U.S. Pat. No. 3,724,959 to Koulicovitch describes a high precision photoelectric microscope for reading the mark of a precision ruler, and U.S. Pat. No. 4,385,317 to Furuya et al describes a specimen image display apparatus that projects a scale on a video display that corresponds to the magnification of the image.

While the foregoing and other prior art devices and methods have proved useful, they suffer from several disadvantages. For example, conventional measuring practice requires the measuring of an object with a scale and its subsequent conversion into the actual measurement through tedious calculations. Such practice is inefficient and highly prone to error. Furthermore, such a method often requires the reference to external tables and calculation devices, which may not be available. Finally, the measuring devices utilized may be awkward or difficult to use.

Accordingly, it is an object of the present invention to overcome or eliminate such inefficiencies and disadvantages by providing a set of Scanning Electron Microscope Rulers and a method of using the rulers to measure the size of an object displayed by a magnification system such as a scanning electron microscope that is more precise, does not require any computations, does not require reference to external tables, and is easy to use.

SUMMARY

A set of Scanning Electron Microscope Rulers, wherein each ruler corresponds to a specific magnification factor of a scanning electron microscope and includes indicia comprising a plurality of graduations and corresponding reference markings. The graduations and markings of each ruler indicate an actual dimension of the specimen to be measured.

Further, a method for using the rulers to measure the dimension of a specimen that is displayed as a magnified image by a scanning electron microscope, comprising the steps of: providing a set of ruled devices for measuring the dimension of the specimen, whereby each ruled device is associated with a separate magnification factor; selecting a ruled device that corresponds with a selected magnification factor; and measuring the dimension with the selected ruled device, whereby the indicia of the selected ruled device indicates the actual dimension of the specimen.

BRIEF DESCRIPTION OF THE DRAWINGS

FIG. 3H is a reduced top plan view showing an SEM Ruler having a Magnification of 45k.

FIG. 3I is a reduced top plan view showing an SEM Ruler having a Magnification of 50k.

FIG. 3J is a reduced top plan view showing an SEM Ruler having a Magnification of 60k.

FIG. 3K is a reduced top plan view showing an SEM Ruler having a Magnification of 70k.

FIG. 3L is a reduced top plan view showing an SEM Ruler having a Magnification of 80k.

FIG. 3M is a reduced top plan view showing an SEM Ruler having a Magnification of 90k.

FIG. 3N is a reduced top plan view showing an SEM Ruler having a Magnification of 100k.

DETAILED DESCRIPTION OF THE INVENTION

The ruler set of the present invention is especially useful for measuring scanning electron microscope pictures of various magnifications. It should be understood, however, that the set of rulers of the present invention can also be used to measure magnified or reduced images created by other means including optical pictures, street maps, architectural maps, designs, x-rays, ultra-sound images, Cat-Scan images or any other object displayed as a magnified or reduced image.

Figure 1:
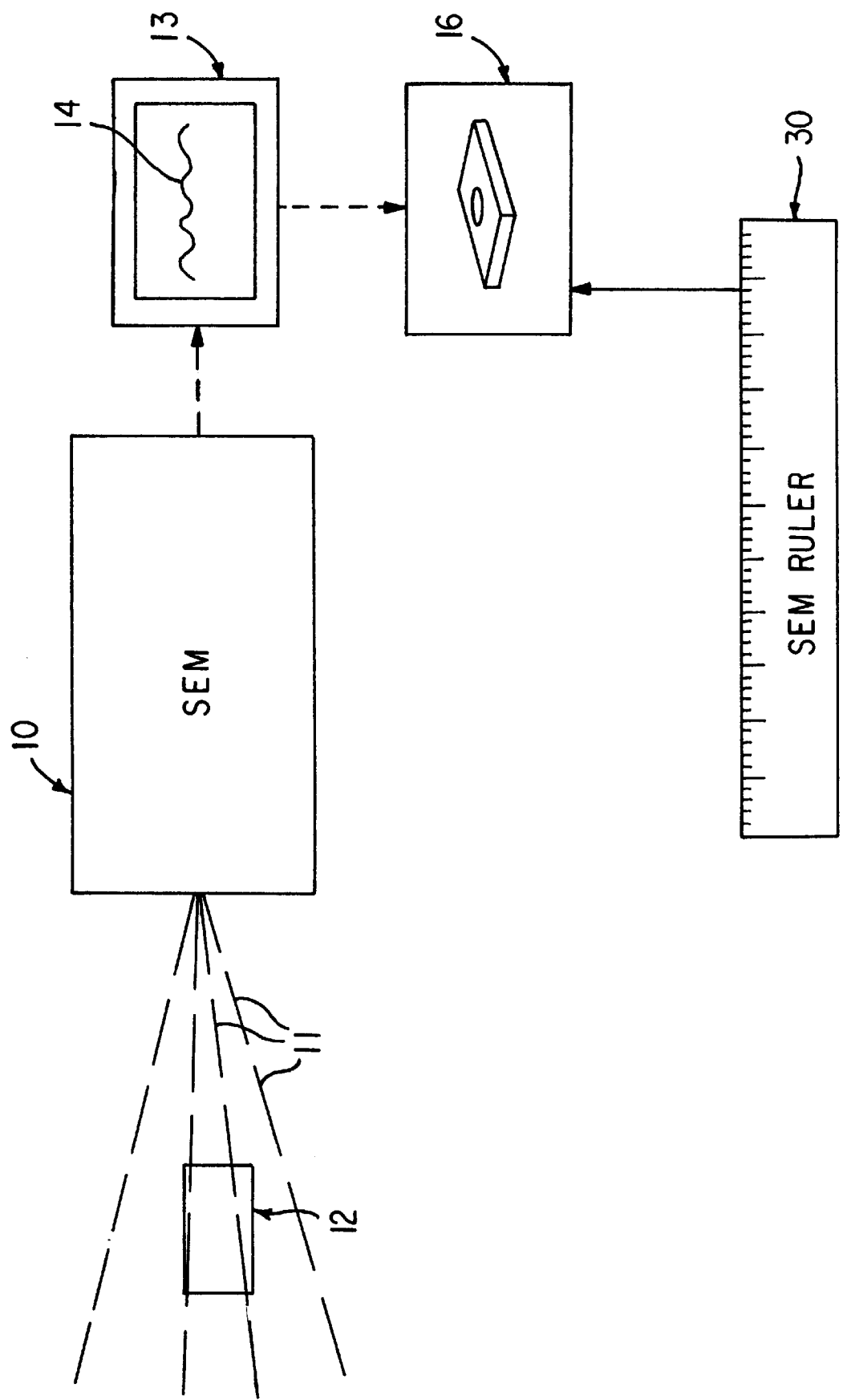
FIG. 1 is a block diagram showing the display of a magnified image by a scanning electron microscope.

The magnification system depicted in FIG. 1, by way of example, is a Scanning Electron Microscope (SEM) 10 having a plurality of magnification factors. The magnification factors of the present invention are standard for an SEM and range from 10,000× to 100,000× (10k to 100k) in increments of 5,000× or 5k.

Upon the activation of the SEM 10, a magnification factor (MF) between 10k and 1ook is selected. The SEM 10 bombards a specimen 12 to be measured with a beam of electrons 11, generally less than 100 Angstroms in diameter, to generate an image 14 having a magnification factor of MF which is displayed on a cathode ray tube 13 and is photographed. Other means for providing a hard-copy 16 of the magnified image are available and known. A resulting photograph 16 or hard-copy 16 of the image is provided with a magnification factor of MF and a measurable dimension.

Accordingly, the present invention comprises a set of fourteen (14) transparent measuring rulers 30 or Scanning Electron Microscope Rulers (SEM Rulers) for measuring a specimen 12 displayed as a magnified image 14 such as a photograph 16 or a printed hard-copy 16. The rulers 30 are manufactured through standard photo-printing techniques well known in the art. Particularly, the rulers 30 are printed on sheets of transparent acrylic plastic through extremely accurate art work prepared by a computer. The sheets are then cut using cutting techniques well known in the art to form individual rulers 30. It should be understood that any suitable transparent material can be used to construct the rulers 30, including the materials known by the trademarks MYLAR and LEXAN. Furthermore, the present invention is not limited to a set of fourteen (14) rulers; the number of rulers in the set can be modified based on the number of magnification factors available.

As shown, the SEM Rulers 30 are rectangular, having a preferred length of 5.5 inches and a width of 1.25 inches. It should be understood that the present invention is not limited to the size constraints of the exemplary embodiments; the dimensions of the SEM Ruler can vary in accordance with the image 14.

Figure 2:
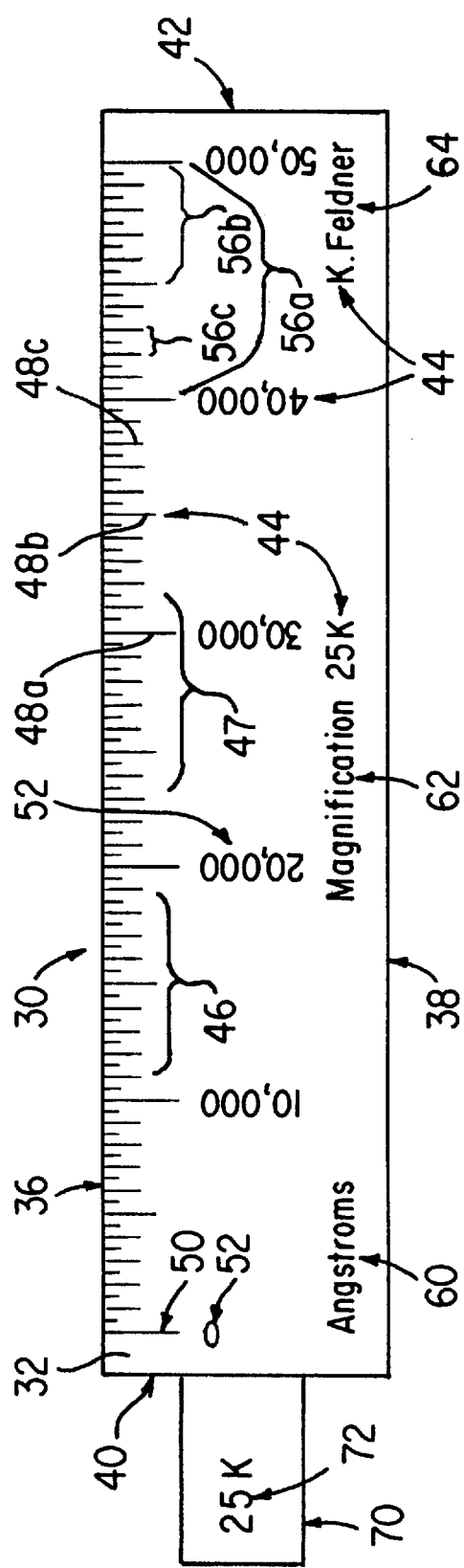
FIG. 2 is a reduced top plan view showing the SEM Ruler.

Referring to FIG. 2, each of the transparent SEM Rulers 30 comprises an upper surface 32, a lower surface, not shown, a first longitudinal edge 36, a second longitudinal edge 38, a first end edge 40, and a second end edge 42.

Extending along the upper surface 32 of the ruler 30 is indicia 44 that includes a scale 46, a unit indicator 60, a magnification factor indicator 62, and a logo 64.

Disposed along the upper surface 32 and adjacent to the first longitudinal edge 36 of the ruler 30 is the scale 46, which includes a first graduation 50 and plurality of transversely extending graduations 47 spaced thereafter. The graduations 47 include a plurality of major graduations 48a, a plurality of intermediate graduations 48b, and a plurality of minor graduations 48c, forming full increments 56a, partial increments 56b, and minor increments 56c, therebetween. In addition, each major graduation 48a is sequentially marked with a numerical reference 52, which is calibrated to indicate a distance in Angstroms which corresponds to the selected magnification factor MF. It should be understood the present invention is not limited to the indicia 44 and scale 46 disclosed herein.

Disposed along the second longitudinal edge 38 near the first end edge 40 on the upper surface 32 of the ruler 30 is the unit indicator 60, which is expressed in Angstroms. Although the exemplary embodiment of the present invention is expressed in Angstroms, other units fall within the scope of this invention.

Disposed along the second longitudinal edge 38 near the second edge 42 on the upper surface 32 of the ruler 30 is the logo 64, which can comprise any suitable design or ornamentation.

Figure 3A:
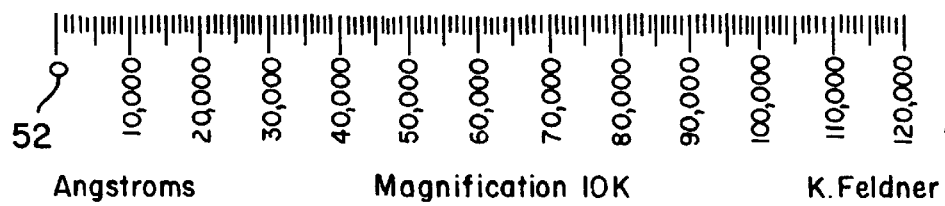
FIG. 3A is a reduced top plan view showing an SEM Ruler having a Magnification of 10k.
Figure 3B:
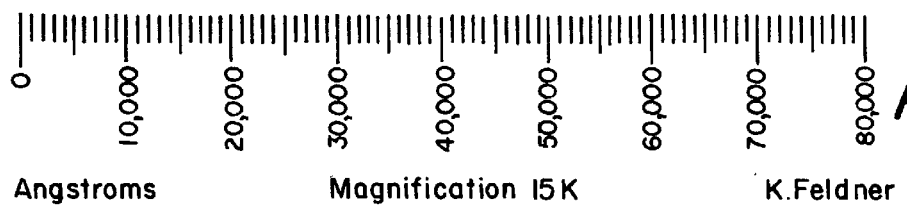
FIG. 3B is a reduced top plan view showing an SEM Ruler having a Magnification of 15k.
Figure 3C:
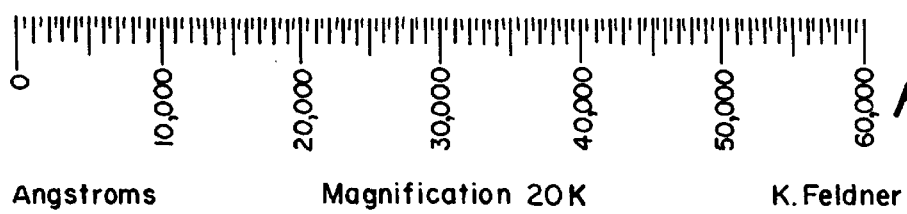
FIG. 3C is a reduced top plan view showing an SEM Ruler having a Magnification of 20k.
Figure 3D:
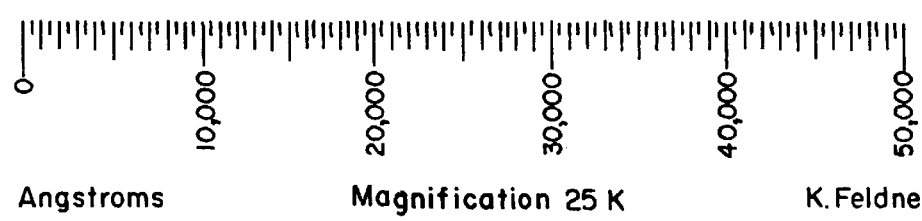
FIG. 3D is a reduced top plan view showing an SEM Ruler having a Magnification of 25k.
Figure 3E:
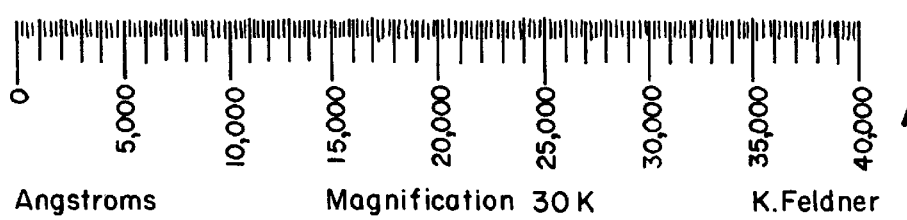
FIG. 3E is a reduced top plan view showing an SEM Ruler having a Magnification of 30k.
Figure 3F:
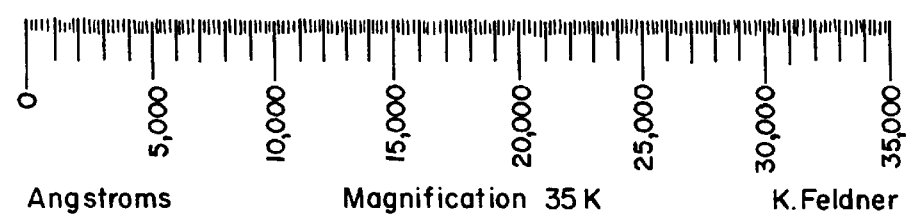
FIG. 3F is a reduced top plan view showing an SEM Ruler having a Magnification of 35k.
Figure 3G:
FIG. 3G is a reduced top plan view showing an SEM Ruler having a Magnification of 40k.

Centrally disposed along the second longitudinal edge 38 on the upper surface 32 of the ruler 30 is the magnification factor indicator 62. FIGS. 3A–3N show a set of fourteen (14) SEM Rulers 28, whereby each ruler 30 corresponds to a specific Magnification Factor MF selected from the following group: 10k, 15k, 20k, 25k, 30k, 35k, 40k, 45k, 50k, 60k, 70k, 80k, 90k, and 100. It should be understood that the rulers of the present invention are not restricted to the magnification factors disclosed herein; the rulers can be modified to accommodate other magnification factors.

To illustrate the present invention, the exemplary embodiment shown in FIG. 3A shows a SEM Ruler 30 that corresponds to a magnification factor of 10k. The ruler 30 includes a scale 46 with graduations 47 and numerical references 52 spanning between 0 Angstroms and 120,000 Angstroms. The scale 46 is divided up into twelve (12) full increments 56a, each equalling 10,000 Angstroms. Further, each full increment 56a is divided into two (2) partial increments 56b of 5,000 Angstroms and ten (10) minor increments 56c of 1,000 Angstroms. It should be understood that the true measurements of the above increments 56 are actually a product of the indicated references 52 and the magnification factor MF of the ruler 30.

Figure 4:
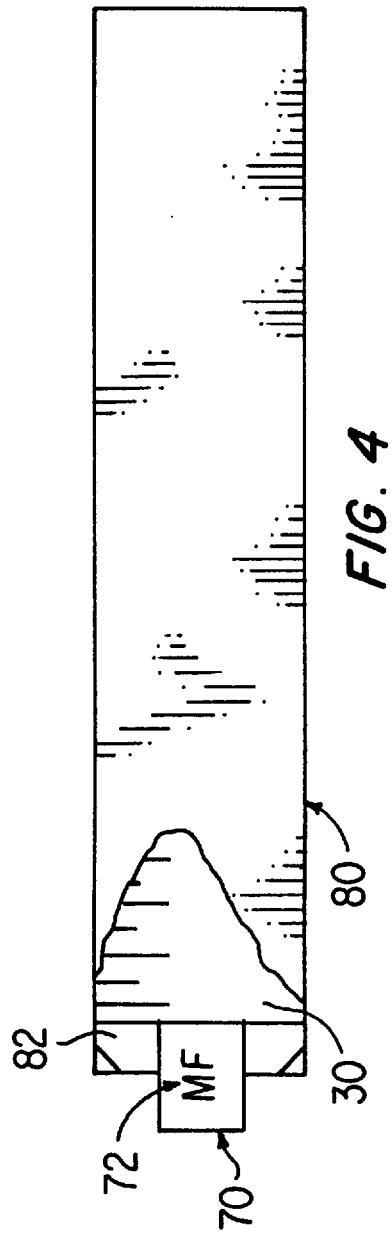
FIG. 4 is reduced top plan view showing the set of SEM Rulers in a storage receptacle.

Referring now to FIG. 4, the set of SEM Rulers 28 is stored within a hollow 82 of an envelope or storage receptacle 80. Each of the rulers 30 further includes a pull tab 70 for removing the rulers 30 from the envelope 80. The pull tab 70 of the exemplary embodiment is affixed to the first end edge 40 of the ruler 30 and has a length of approximately 0.5 inch. The length of the tab 70, however, can be varied, provided that it permits the easy removal of the ruler 30 from the hollow 82 of the envelope 80. Finally, the pull tab 70 includes an indicia 72 for indicating the magnification factor. It should be understood that the present invention is not restricted to the pull tab 70 and the storage receptacle 80 disclosed herein; any other suitable structures can be employed.

Figure 5:
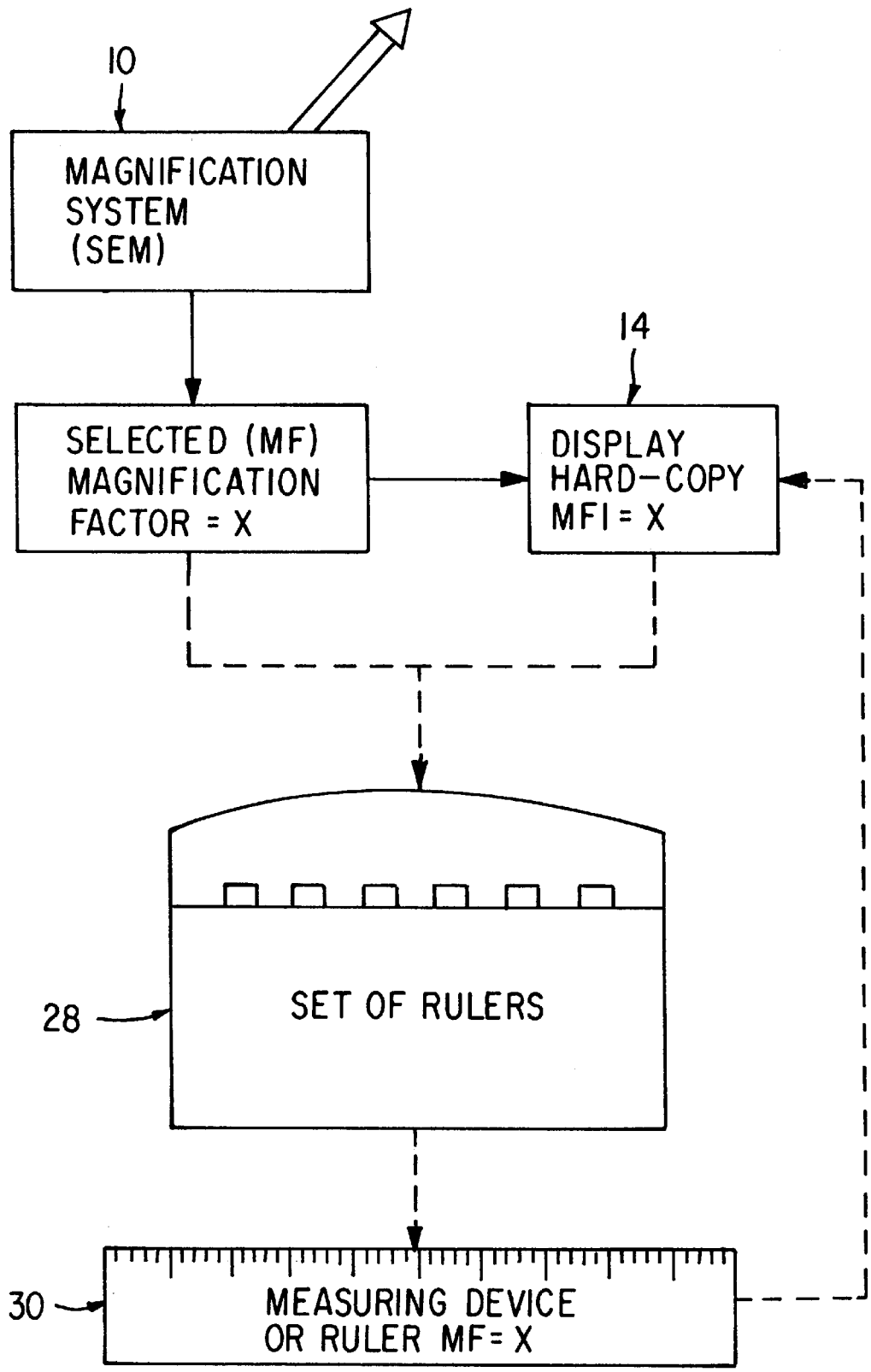
FIG. 5 is block diagram of a method of measuring the display of a scanning electron microscope.

The method for using the set of rulers 28 described above will now be described in conjunction with FIG. 5. A ruler 30 is selected from the set 28 that corresponds to the magnification factor MF of the scanning electron microscope 10 selected by the operator. For example, if the operator produces an image with the scanning electron microscope 10 having a magnification factor of 90k, the ruler shown in FIG. 3M would be selected.

Next, the dimension of the photograph 16 is measured. First, the selected ruler 30 is superimposed over the photograph 16 of the specimen 12. Second, the graduations 47 of the ruler 30 are aligned with a first and last reference point of the dimension. Finally, the reference numeral 52 adjacent to the last reference point of the dimension is noted to indicate the length of the dimension in Angstroms.

Accordingly, the present invention offers several advantages over the prior art. First, the rulers eliminate the need for complex calculations and calculating devices. Second, the rulers eliminate the need for reference to external tables. Third, the rulers are transparent and do not obscure the image to be measured. Fourth, the rulers are flexible, which allow the measurement of images of various mediums, such as video displays. Fifth, the rulers are calibrated to less than 1% of the measurements indicated, which is more accurate than most measuring methods known in the art. In fact, this error can be minimized through more efficient production techniques. Six, the receptacle provided forms a convenient storage and carrying unit for the rulers. Finally, the rulers are paperless and are therefore suitable for clean rooms.

While preferred forms and arrangements have been shown in illustrating the invention, it is to be understood that various changes may be made without departing from the spirit and scope of this disclosure.

What is claimed is:

1. A set of transparent ruled devices for measuring an actual dimension of a specimen displayed as a magnified image by a magnification system having a plurality of magnification factors, comprising:

a plurality of transparent planar ruled devices, each of said ruled devices having indicia of a linear scale associated with a predetermined selected magnification, whereby each ruled device has a separate associated magnification factor, wherein said indicia enables the measurement of an actual dimension of said magnified image, so that anyone of said plurality of ruled devices can be selected according to a selected magnification factor;

wherein said set is stored within a receptacle and said set includes pull tab means for removing said devices from said receptacle.

2. A set of transparent ruled devices according to claim 1, wherein the set has a transparent ruled device having an indicia for the predetermined selected magnification of the magnification system which is a scanning electron microscope having a range of magnification factors from 10,000× to 100,000× in increments of 5,000×.

3. The set of claim 1, wherein said indicia includes a scale calibrated in units of measurement.

4. The set of claim 1, wherein said ruled devices are comprised of a transparent plastic material.

5. A method of measuring an actual dimension of a specimen, wherein said specimen is displayed as a magnified image by a magnification system having a plurality of selected magnification factors, said image having dimensions corresponding to a predetermined selected magnification, comprising the steps of:

providing a plurality of measuring devices which are stored within a receptacle, each of said devices having indicia of a linear scale that correspond to an associated one of said magnification factors and pull tab means for removing said devices from said receptacle;

selecting one of said measuring devices, said selected measuring device corresponding to said predetermined selected magnification;

measuring said dimension of said image with said selected measuring device, wherein said indicia of said selected measuring device indicates the actual dimension of said specimen.

6. The method set forth in claim 5, wherein said magnification system is a scanning electron microscope.

7. The method set forth in claim 5, wherein each of said measuring devices is a transparent planar ruled device.

8. A method set forth in claim 5, wherein said indicia includes a first graduation having a zero reference marked thereon and a plurality of graduations linearly spaced with corresponding references marked sequentially thereafter.

9. A method of measuring an actual dimension of a specimen according to claim 5, wherein said magnification system is a scanning electron microscope, said scanning electron microscope having a range of magnification factors from 1,000× to 100,000× in increments of 5,000×.

10. The method set forth in claim 8, wherein said corresponding references are in units of measurement.

11. The method set forth in claim 8, wherein each of said graduations indicates an actual interval of distance of said actual dimension.

12. A method of measuring an actual dimension of a specimen, wherein said specimen is displayed as a magnified hard-copy image via a magnification system, said system having a plurality of selected magnification factors, said hard-copy image having dimensions corresponding to a predetermined selected magnification, comprising the steps of:

providing a plurality of transparent measuring devices which are stored within a receptacle, each of said devices having indicia associated with a predetermined magnification factor, and pull tab means for removing said devices from said receptacle, said indicia of each of said devices including a first graduation having a zero reference marked thereon and a plurality of graduations with corresponding references marked sequentially thereafter, wherein each of said graduations indicates an actual interval of distance of said actual dimension;

selecting one of said measuring devices, said device corresponding to said predetermined selected magnification; and measuring said dimension of said image with said selected measuring device, wherein said graduations of said selected measuring device indicate the actual dimensions of said specimen.

13. The method set forth in claim 12, wherein said magnification system is a scanning electron microscope, said scanning electron microscope have a range of magnification factors from 10,000× to 100,000× in increments of 5,000×.

14. The method set forth in claim 12, wherein said corresponding references are in units of measurement.

15. The method set forth in claim 12, wherein said devices are comprised of a transparent plastic material.

* * * * *